US008863007B2

(12) United States Patent  (10) Patent No.: US 8,863,007 B2
Ang et al.  (45) Date of Patent: Oct. 14, 2014

(54) PROGRAMMATIC INFORMATION TRANSFER

(75) Inventors: Jian Ming Ang, Singapore (SG); Weng Chew Lo, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 12/418,100

(22) Filed: Apr. 3, 2009

(65) Prior Publication Data
US 2010/0257471 A1 Oct. 7, 2010

(51) Int. Cl.
G06F 3/00 (2006.01)
G06F 3/048 (2013.01)
G06F 3/0486 (2013.01)
G06F 3/0481 (2013.01)

(52) U.S. Cl.
CPC .......... *G06F 3/04817* (2013.01); *G06F 3/0486* (2013.01)
USPC ........... 715/748; 715/700; 715/733; 715/764; 715/769; 715/770

(58) Field of Classification Search
USPC .................. 715/700, 733, 748, 764, 769, 770
See application file for complete search history.

(56) References Cited

U.S. PATENT DOCUMENTS

| 5,157,763 | A | * | 10/1992 | Peters et al. ................... 715/769 |
| 5,546,527 | A | * | 8/1996 | Fitzpatrick et al. ............ 715/769 |
| 5,740,389 | A | * | 4/1998 | Li et al. ........................ 715/769 |
| 6,069,615 | A | | 5/2000 | Abraham et al. |
| 6,157,380 | A | | 12/2000 | Bennett et al. |
| 6,185,306 | B1 | * | 2/2001 | Mages et al. ................... 380/203 |
| 6,195,094 | B1 | * | 2/2001 | Celebiler ....................... 715/764 |
| 6,331,840 | B1 | | 12/2001 | Nielson et al. |
| 6,380,956 | B1 | | 4/2002 | Yee et al. |
| 6,697,090 | B1 | * | 2/2004 | Nagasaka et al. ............. 715/769 |
| 6,922,814 | B2 | * | 7/2005 | Sirhall ......................... 715/769 |
| 7,188,139 | B1 | | 3/2007 | Ayatsuka et al. |
| 7,398,476 | B2 | * | 7/2008 | Talley et al. .................. 715/769 |
| 7,426,046 | B2 | * | 9/2008 | Shirai et al. .................. 358/1.13 |
| 7,634,533 | B2 | * | 12/2009 | Rudolph et al. .............. 709/203 |
| 7,665,028 | B2 | * | 2/2010 | Cummins et al. ............. 715/769 |
| 7,861,171 | B2 | * | 12/2010 | Johanson et al. ............. 715/733 |

(Continued)

FOREIGN PATENT DOCUMENTS

WO  WO 2008/085202 A1 * 7/2008

OTHER PUBLICATIONS

TurboFTP, Nov. 10, 2006, 5 pages.*
Split Bar Definition, accessed Mar. 28, 2013, 1 page.*

(Continued)

*Primary Examiner* — Matt Kim
*Assistant Examiner* — Yongjia Pan
(74) *Attorney, Agent, or Firm* — Yee & Associates, P.C.; Steven L. Bennett

(57) ABSTRACT

An illustrative embodiment of a computer-implemented method for information transfer displays a graphical user interface on a display device, wherein the graphical user interface has a plurality of regions defined by boundaries on the display device, wherein each region represents output from an associated data processing system, and responsive to an object in a first region in the plurality of regions in the graphical user interface being moved to a second region in the plurality of regions in the graphical user interface, transferring information associated with the object from a first data processing system associated with the first region to a second data processing system associated with the second region.

20 Claims, 5 Drawing Sheets

(56) References Cited

U.S. PATENT DOCUMENTS

| | | | | |
|---|---|---|---|---|
| 7,941,744 | B2* | 5/2011 | Oppenlander et al. | 715/222 |
| 8,078,688 | B2* | 12/2011 | Ansari et al. | 709/217 |
| 8,087,013 | B2* | 12/2011 | Kelly et al. | 717/168 |
| 2002/0054113 | A1* | 5/2002 | Conrad et al. | 345/764 |
| 2003/0020745 | A1* | 1/2003 | Kawaguchi et al. | 345/733 |
| 2003/0093466 | A1* | 5/2003 | Jarman et al. | 709/203 |
| 2003/0132967 | A1* | 7/2003 | Gangadharan | 345/769 |
| 2004/0006706 | A1 | 1/2004 | Erlingsson | |
| 2004/0103304 | A1 | 5/2004 | Shao | |
| 2004/0226041 | A1 | 11/2004 | Smith et al. | |
| 2005/0091595 | A1* | 4/2005 | Shappell et al. | 715/700 |
| 2005/0160370 | A1* | 7/2005 | Talley et al. | 715/769 |
| 2006/0136835 | A1 | 6/2006 | Hochmuth et al. | |
| 2006/0143580 | A1 | 6/2006 | Gimness et al. | |
| 2006/0168537 | A1 | 7/2006 | Hochmuth et al. | |
| 2007/0016872 | A1* | 1/2007 | Cummins et al. | 715/769 |
| 2007/0234226 | A1* | 10/2007 | Szeto | 715/769 |
| 2007/0250784 | A1* | 10/2007 | Riley et al. | 715/764 |
| 2008/0184148 | A1* | 7/2008 | Selig | 715/769 |
| 2009/0037515 | A1* | 2/2009 | Zapata et al. | 709/202 |
| 2009/0113330 | A1* | 4/2009 | Garrison et al. | 715/769 |
| 2009/0276547 | A1* | 11/2009 | Rosenblatt et al. | 710/33 |
| 2009/0319643 | A1* | 12/2009 | Crisan | 709/221 |
| 2010/0218130 | A1* | 8/2010 | Conrad et al. | 715/769 |
| 2010/0241711 | A1* | 9/2010 | Ansari et al. | 709/205 |
| 2011/0083090 | A1* | 4/2011 | Gwiazda et al. | 715/769 |

OTHER PUBLICATIONS

Move Definition, accessed Mar. 28, 2013, 1 page.*
Implementing Drag and Drop in Visual Basic .NET, Sep. 2003, 11 pages.*
Control.DragEnter Event, Nov. 20, 2007, 7 pages.*
DragDrop.DragEnter Attached Event, Nov. 20, 2007, 5 pages.*
Drag and Drop Overview, Nov. 20, 2007, 12 pages.*
Drag and drop to initiate file transfer, Sep. 26, 2007, 6 pages.*
IDropTarget:DragEnter (Windows CE 5.0), Aug. 2004, 5 pages.*
Takeshi Nishida, Takeo Igarashi, Drag-and-Guess Drag-and-Drop with Prediction, 2007, 14 pages.*

* cited by examiner

PROGRAMMATIC INFORMATION TRANSFER

BACKGROUND

1. Field

The disclosure relates generally to an improved data processing system, and in particular, to a method, apparatus and computer-implemented program product for transferring information. Still more particularly, to a computer-implemented method, an apparatus and a computer program product for information transfer.

2. Description of the Related Art

Computer programmers and support personnel commonly work in an environment in which multiple computing systems are used. In many cases, a single person may be interacting with more than one computing system in an apparent concurrent manner. For example, a support person may work with a security application, a printing management application, and an email application. Each application executes on different computer systems. In another example, an order processing system may function by geographic region requiring a west system and an east system to be monitored side by side. In yet another example, on old system operates on an old computer system while the newer, replacement system operates on the new computer system. This arrangement causes the support person to need to view each computer system during operation. Each of the computing systems in the examples may be a separate software and hardware combination including a display device, system unit and user input devices, such as a keyboard and mouse.

The hardware required, such as the processor unit, display device, input devices and related interconnect and communication cables to support these computing systems typically leads to clutter because the available work space becomes crowded with equipment. The requirement to use multiple computing systems may be further driven by a need to communicate over differing networks or different systems on the same network.

SUMMARY

According to one embodiment of the present invention, a computer-implemented method for information transfer displays a graphical user interface on a display device, wherein the graphical user interface has a plurality of regions defined by boundaries on the display device, wherein each region represents output from an associated data processing system, and responsive to an object in a first region in the plurality of regions in the graphical user interface being moved to a second region in the plurality of regions in the graphical user interface, transfers information associated with the object from a first data processing system associated with the first region to a second data processing system associated with the second region.

According to another embodiment, an apparatus for information transfer, comprises a communication fabric, a memory connected to the communication fabric, wherein the memory contains computer-executable code stored therein, a communications unit connected to the communication fabric, a display connected to the communication fabric and a processor unit connected to the communication fabric, wherein the processor unit executes the computer-executable code to direct the apparatus to display a graphical user interface on a display device wherein the graphical user interface has a plurality of regions defined by boundaries on the display device, wherein each region represents output from an associated data processing system, and responsive to an object in a first region in the plurality of regions in the graphical user interface being moved to a second region in the plurality of regions in the graphical user interface, transfers information associated with the object from a first data processing system associated with the first region to a second data processing system associated with the second region.

According to another embodiment, a computer program product for information transfer, comprises a computer-usable medium containing computer-executable code stored therein, the computer-executable code comprising, computer-executable code for displaying a graphical user interface on a display device wherein the graphical user interface has a plurality of regions defined by boundaries on the display device, wherein each region represents output from an associated data processing system, and computer-executable code responsive to an object in a first region in the plurality of regions in the graphical user interface being moved to a second region in the plurality of regions in the graphical user interface, for transferring information associated with the object from a first data processing system associated with the first region to a second data processing system associated with the second region.

DETAILED DESCRIPTION OF THE INVENTION

Figure 1:
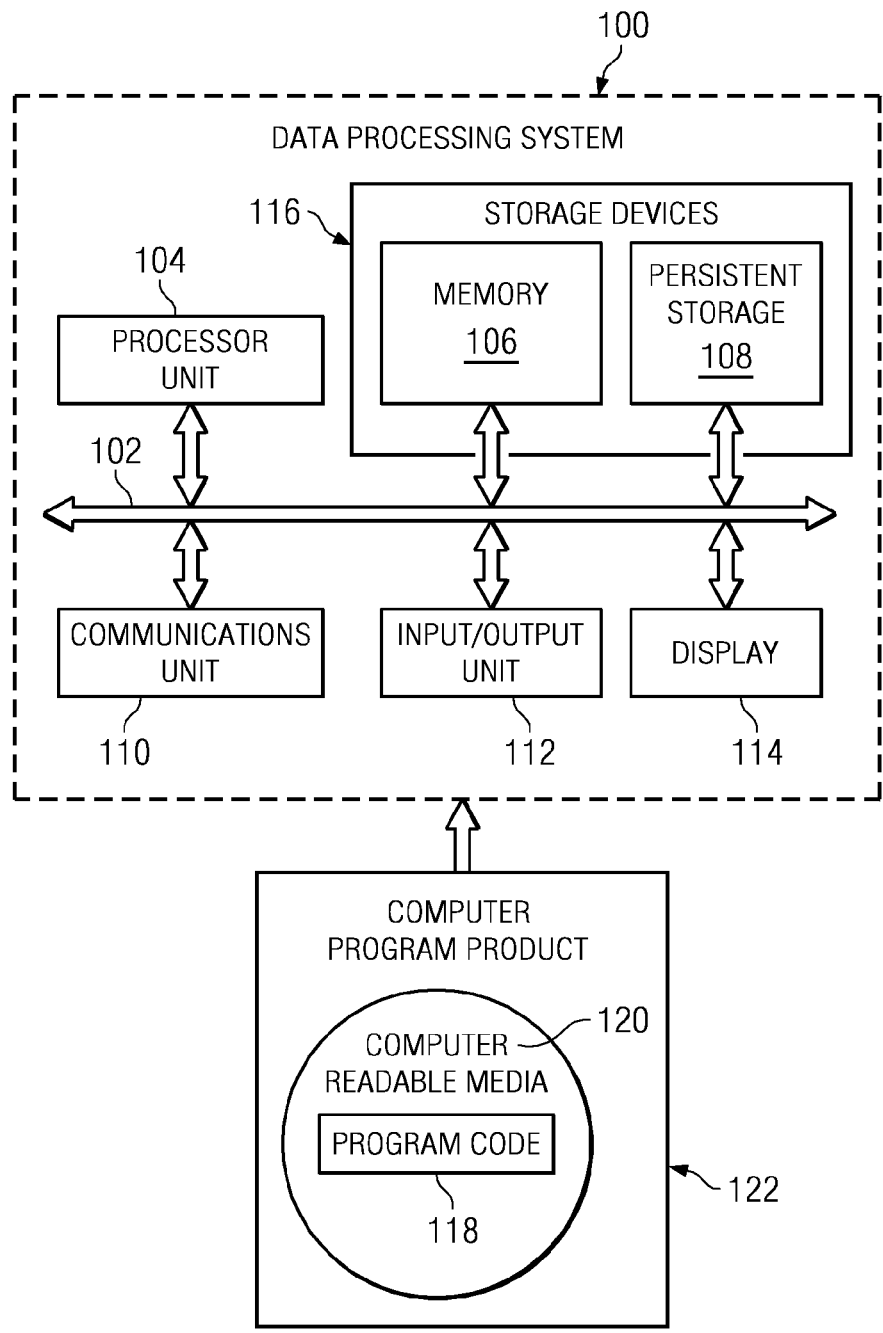
FIG. 1 is a block diagram of an apparatus in the form of a data processing system in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by, or in connection with, the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus, to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer, or other programmable data processing apparatus, to function in a particular manner, such that the instructions stored in the computer-readable medium produce an article of manufacture including instruction means which implement the function/act specified in the flowchart and/or block diagram block or blocks.

The computer program instructions may also be loaded onto a computer, or other programmable data processing apparatus, to cause a series of operational steps to be performed on the computer, or other programmable apparatus, to produce a computer-implemented process such that the instructions which execute on the computer, or other programmable apparatus, provide processes for implementing the functions/acts specified in the flowchart and/or block diagram block or blocks.

With reference now to the figures, and in particular with reference to FIG. 1, exemplary diagrams of data processing environments are provided in which illustrative embodiments may be implemented. It should be appreciated that the figures are only exemplary and are not intended to assert or imply any limitation with regard to the environments in which different embodiments may be implemented. Many modifications to the depicted environments may be made.

Turning now to FIG. 1, a block diagram of an apparatus in the form of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display device 114 provides a hardware mechanism to display information to a user.

Instructions for the operating system, applications and/or programs may be located in storage devices 116, which are in communication with processor unit 104 through communications fabric 102. In these illustrative examples the instruction are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer-usable program code, or computer-readable program code that may be read and executed by a processor in processor unit 104. The program code in the different embodiments may be embodied on different physical or tangible computer-readable media, such as memory 106 or persistent storage 108.

Program code 118 is located in a functional form on computer-readable media 120 that is selectively removable and may be loaded onto or transferred to data processing system 100 for execution by processor unit 104. Program code 118 and computer-readable media 120 form computer program product 122 in these examples. In one example, computer-readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer-readable media 120 also may take the form of a persistent storage, such as a hard drive, a thumb drive, or a flash memory that is connected to data processing system 100. The tangible form of computer-readable media 120 is also referred to as computer-recordable storage media. In some instances, computer-readable media 120 may not be removable.

Alternatively, program code 118 may be transferred to data processing system 100 from computer-readable media 120 through a communications link to communications unit 110 and/or through a connection to input/output unit 112. The communications link and/or the connection may be physical or wireless in the illustrative examples. Computer-readable media 120 may also be referred to as a computer-usable medium which may be in the form of a tangible recordable medium suitable for storage of program code 118. The computer-readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer-readable storage medium in a server data processing system may be downloaded over a network from the server to data processing system 100. The data processing system providing program code 118 may be a server computer, a client computer, or some other device capable of storing and transmitting program code 118. Program code 118 may also be referred to a computer-executable code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer-readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

The different illustrative embodiments recognized the need to have the user, who may be a developer, computer programmer or support personnel, viewing multiple different display devices poses an inconvenience and causes a lack of focus for the user. The illustrative embodiments recognize the difficulty arises because the user has to visually and mentally switch between the screens of the display devices. Each time a switch is made, the user has to re-focus attention to the task and data at hand while transitioning between systems. Further, data that may be needed on one system may only be available on another system, requiring user recall to use the data on another system.

Thus, the illustrative embodiments provides a method, apparatus and computer-program product for information transfer that displays a graphical user interface wherein the graphical user interface has a plurality of regions defined by boundaries on a display device, wherein each region represents output from an associated data processing system, and responsive to an object in a first region in the plurality of regions in the graphical user interface being moved to a second region in the plurality of regions in the graphical user interface, transfers the information associated with the object from a first data processing system associated with the first region to a second data processing system associated with the second region.

Using the example of the apparatus of FIG. 1, a pair of data processing systems comprising systems, such as data processing system 100, may be configured to connect to an integrated display device, such as display device 114 capable of displaying a user interface for each data processing system 100 in a respective separate region of display 114. Communications unit 110 provides connectivity in a wired or wireless manner with a file transfer device. Communications fabric 102 provides a capability for sending and receiving data between storage devices 116 of the systems. The file transfer is initiated in response to a selection of an object in a display region associated with one system and placement of the selected object in the display region other system. For example, selecting and dragging an object from a source system having the display region in a left portion of display device 114 to a target system having the display region in a right portion of display device 114 triggers transfer of the object from the source to the target system. The combination of systems interfacing with an integrated display device and file transfer device thus provide user interface initiated programmatic file transfer.

In the illustrative embodiment, two computers on two different networks are used by a single user with the user interface of both computers being displayed on a single display. A user has the capability to drag and drop objects between the different systems on different networks using the single display screen.

The integrated screen enables a user to see the output from the two systems on a single screen. In addition, the sharing of folders between computers is enabled. A user is able to copy or move the files from one computer to the next simply by a drag and drop operation. The boundary between the systems displayed is demarcated by a line in between the displayed user interface screens. Sharing of files occurs with the user dragging an object from one system and dropping the object in the other system represented by the user interfaces on the display.

Figure 2:
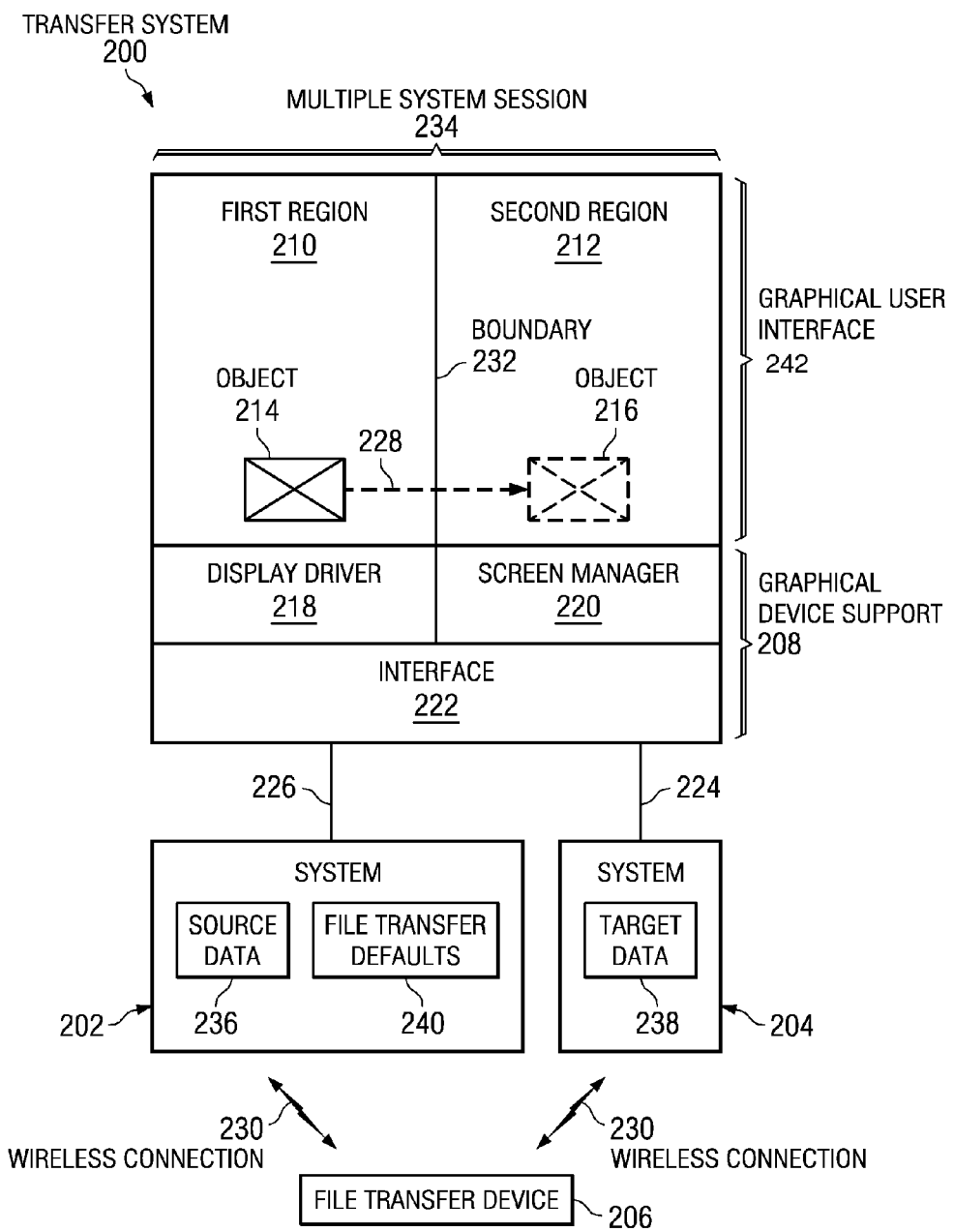
FIG. 2 is a block diagram of a user interface initiated programmatic file transfer system, in accordance with illustrative embodiments.

With reference now to FIG. 2, a block diagram of a user interface initiated programmatic file transfer system is presented in accordance with illustrative embodiments. Transfer system 200 includes a number of components connected together and functioning in cooperation to provide a capability of a user interface initiated programmatic file transfer between two systems. In one illustrative embodiment, transfer system 200 includes components comprising a pair of data processing systems, system 202 and system 204, connected to file transfer device 206 by wireless connection 230, wherein each system is further connected by link 224 and link 226 to interface 222 of the hardware of graphic device support 242 to support graphical user interface 208. The combination of graphical user interface 208 and graphical device support 242 provides an example of display device 114 of data processing system 100 of FIG. 1.

System 202 and system 204 are examples of data processing system 100 of FIG. 1, connected by link 224 and link 226 to interface 222 wherein each system representation is displayed in a portion of graphical user interface 208. System 202 may be referred to as a source system or a first data processing system while system 204 may be referred to as a target system or a second data processing system. The designation of source system and target system or first and second data processing system may also be reversed without affecting the process as the term source relates to the initiation system of the selection for file transfer. Selected information, such as data represented by an object depicted in the graphical user interface, is to be transferred from the source system to the target system. Two or more systems may also be present in a multiple system configuration.

The information represented by the object includes data in the form of a file, a log, a program and/or other suitable information maintained on a data processing system. The combination of systems depicted as first region 210 and second region 212 in graphical user interface 208 represents an example of a multiple system session such as multiple system session 234 for a user in which the user is capable of interacting with each system. A multiple system session is the capability to interact concurrently with a plurality of systems using a common graphical user interface, such as graphical user interface 208. Interaction occurs with each system represented by the graphical user interface. Interaction with a system represents a session, therefore interaction with multiple systems as described represents a multiple system session. Data processing systems representative of system 202 and system 204 can be a desktop computer, a mobile phone, a server computer, a router, and/or any other suitable data processing system.

Graphical user interface 208 provides a logically portioned display area of first region 210 and second region 212 respectively, representing user interface information of system 202 and system 204 respectively. In this manner, the graphical user interface can represent a plurality of display regions for a corresponding plurality of systems. For example, first region 210 depicts object 214 representing source data 236 of the source system, system 202. Second region 212 depicts object 216 representing target data 238 in the target system of system 204. Object 216 is shown as a dotted element indicated by dotted arrow 228 because the transfer operation has not occurred. The example illustrates the proposed transfer operation and intended result. File transfer may be directed according to values received from a user input or from file transfer defaults 240 stored in a storage location typically as application or user preferences. User input may typically be received in response to a request to a user for data, but may also be obtained from a file input. For example a response file can be used to provide predefined input to control a process.

Display driver 218 provides a capability to partition graphical user interface 208 into a plurality of display regions, with a display region identified for each respective system. The display regions are separated from each other by boundary 232. Boundary 232 may be a visible demarcation such as a black border between display regions or an invisible line between different display regions. For example, graphical user interface 208 depicts a boundary as a black line between two display regions of first region 210 and second region 212. In another example, first region 210 may be separated from second region 212 by a white space or a change in cursor style or color to indicate a plane has been crossed between regions. A straight line is not necessary to indicate a boundary between respective display regions of the graphical user interface. The existence of a boundary, in one form or another, indicates the presence of multiple system sessions.

In the illustrative embodiment, interface 222 provides the connectivity capability to attach systems that participate in the file transfer. Attachment of the pair of systems to interface 222 is provided by respective link 224 and link 226. Display driver 218, screen manager 220 and interface 222 comprise graphic device support 242. Graphic device support 242 is typically implemented as a combination of hardware and software.

Screen manager 220 determines whether multiple system sessions are present and coordinates the graphical user interface representation in the display regions for system 202 and system 204 in this example. For example, a multiple system session occurs when more than one system is enabled to use graphical user interface 208. When there is a single system session there is no visible or invisible boundary present. Screen manager 220 further provides a capability to track user interaction for each system in a display region associated with a respective system. For example, screen manager 220 determines the display area of graphical user interface 208 and partitioning of the screen to support each respective system. Screen manager 220 also tracks location and movement representative of a user input device. For example, the display are may vary by model and screen manager 220 is made aware of the total display area then logically partitions the area for use by each system. As the user moves the input device, such as a mouse, a pointer or selector is represented on the display area of the respective system. Screen manager 220 determines when the selector moves from first region 210 across boundary 232 to second region 212.

The illustration of transfer system 200 in FIG. 2 is not meant to imply physical or architectural limitations on the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments. For example, file transfer device 206 may be embedded in one of the participating systems or may implemented as a separate server as shown. In another example, graphical user interface 208 and system 202 may be combined as a single device with connectivity to system 204. In yet another illustrative example, system 202 and system 204 may be represented as logical partitions within a single partitioned system connected to graphical user interface 208. In yet another example, file transfer may involve more than the two systems depicted.

Figure 3:
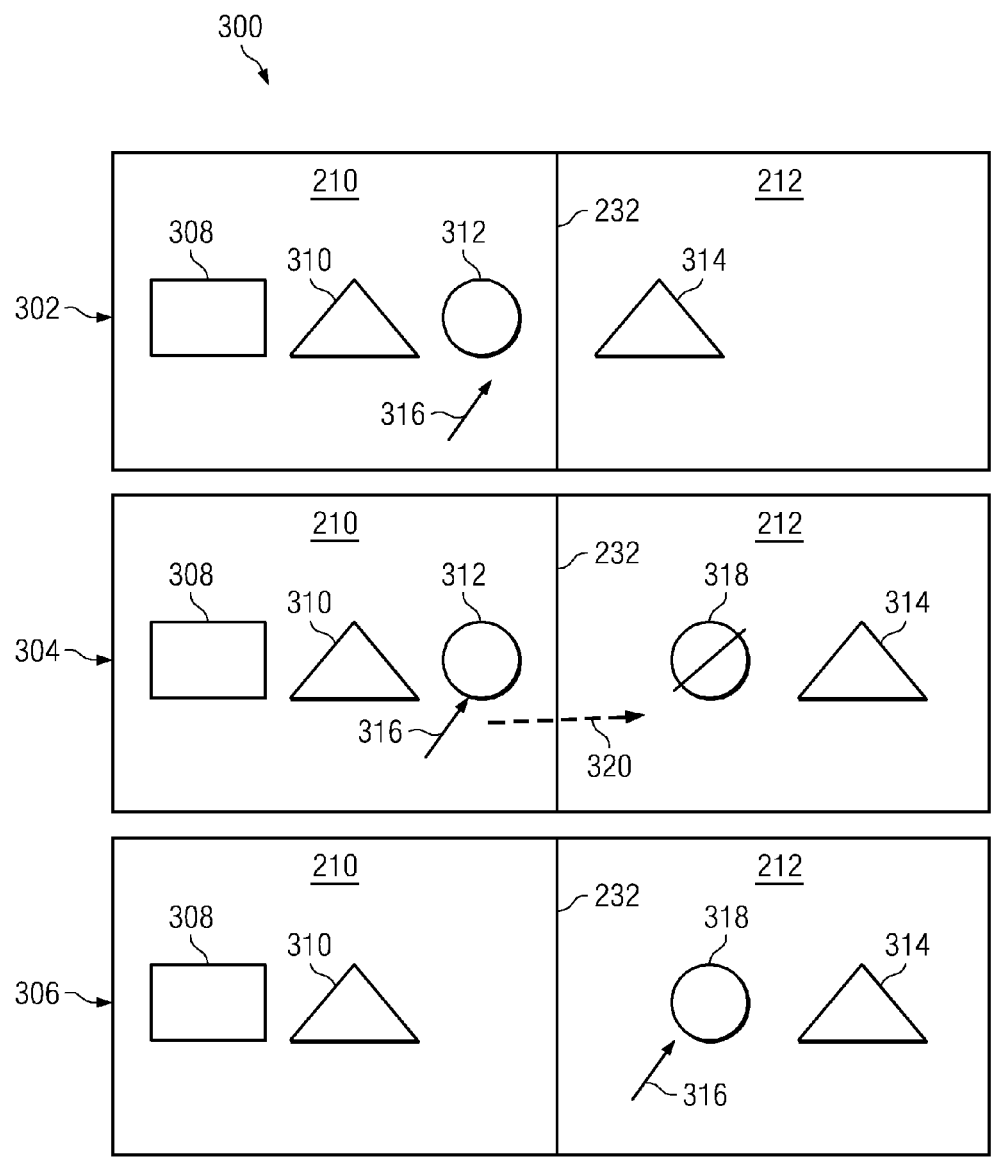
FIG. 3 is a block diagram of a sequence of operations to initiate a file transfer in the system of FIG. 2, in accordance with illustrative embodiments.

With reference to FIG. 3, a block diagram of a sequence of operations to initiate a file transfer in the system of FIG. 2 is presented in accordance with illustrative embodiments. Sequence 300 represents a typical series of operations in the performance of a user interface initiated programmatic file transfer in accordance with illustrative embodiments.

Example 302 in sequence 300 represents the initial state of operations as shown by each respective user interface. Graphical user interface 208 of FIG. 2 depicts first region 210 and second region 212. First region 210 contains objects 308, 310 and 312, as well as selector 316. Corresponding second region 212 contains object 314. Selector 316 is typically a graphical representation of a pointing device position, such as that of a mouse pointer. In another example, selector 316 may be a representation of a stylus, light pen or eyesight directed pointing device. Objects 308, 310 and 312 are graphical representations of data such as source data 236 of system 202 and object 314 is graphical representations of target data 238 of system 204 of FIG. 2. 308, 310 and 312 are graphical representations such as files or file folders usually seen in a graphical user interface as shown in a desktop or a directory listing view. Other graphic representations of data objects may also be manipulated in a similar known manner.

Example 304 illustrates a similar situation as example 302, however selector 316 is now pointing to object 312 indicating an object selection. Dashed selector 320 is shown in the example across boundary 232 between first region 210 and second region 212, pointing toward object 318 in second region 212. Dashed selector 320 is shown to indicate the dragging of object 312 from first region 210 into second region 212. The detection of selector 320 dragging object 312 across boundary 232 initiates the file transfer operation. Object 318 is shown in the example with a diagonal to indicate the file transfer has not yet occurred. Such a visual indication may not normally appear in the user interface, but is depicted in the example for illustrative purpose.

Example 306 illustrates completion of the user interface initiated programmatic file transfer with object 318 positioned in second region 212. The drag and drop of object 312 from first region 210 into second region 212 to create object 318 is performed as a move operation in this example. The move operation results in the deletion of the source object, object 312 from the graphical user interface as well as source data 236 in this example, upon successful file transfer. Target data 238 is created on target system of system 204. Selector 316 remains in display region 212.

Figure 4:
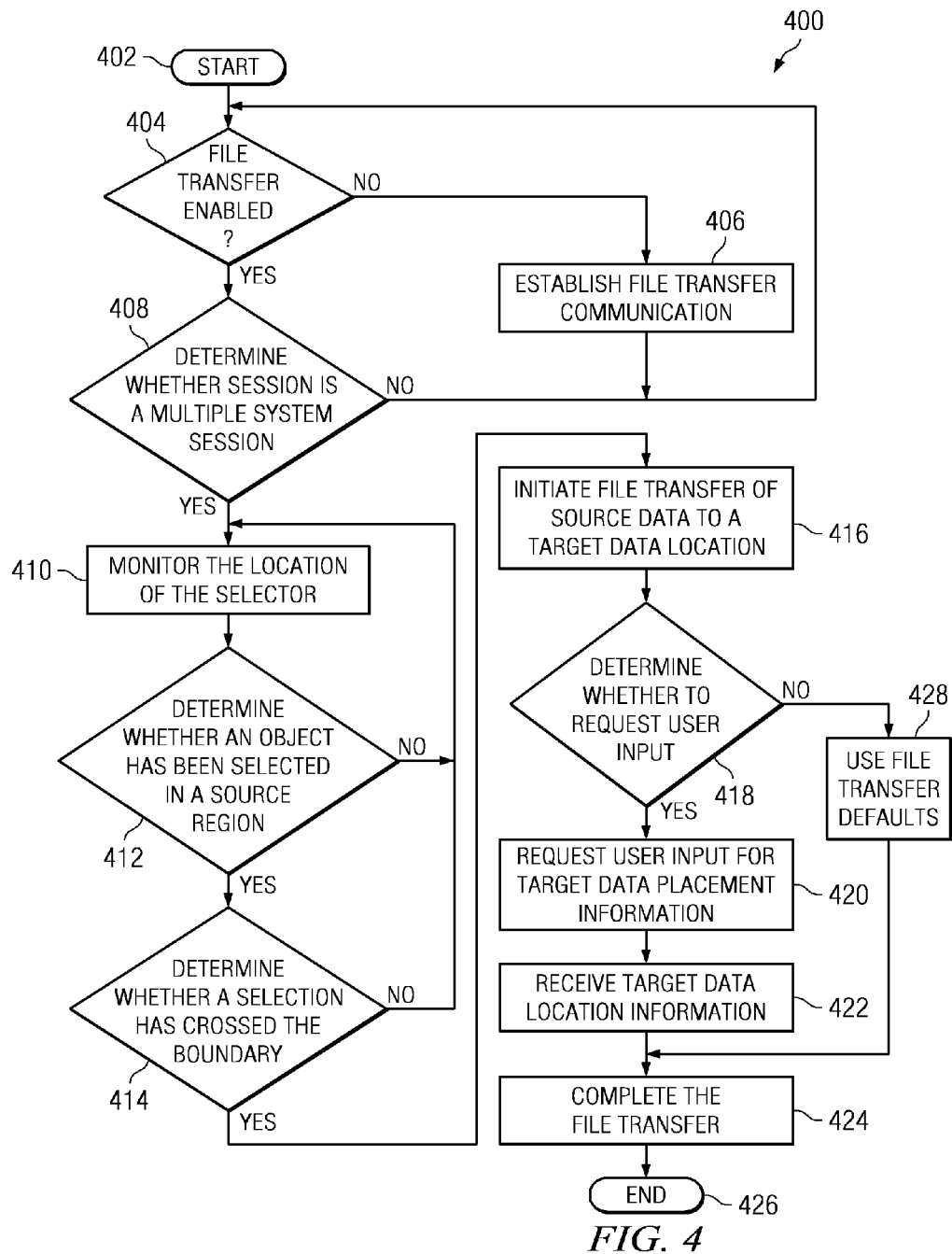
FIG. 4 is flowchart of a file transfer process using the system of FIG. 2, in accordance with illustrative embodiments.

With reference to FIG. 4, a flowchart of a file transfer process using the system of FIG. 2 is presented in accordance with illustrative embodiments. Process 400 is an example of a file transfer process managed by screen manager 220 of transfer system 200 of FIG. 2.

Process 400 starts (step 402) and determines whether file transfer has been enabled (step 404). File transfer has been enabled when a connection has been established between the two participating systems. For example, in FIG. 2, wireless connection 230 has been initiated between system 202 and system 204. When file transfer has been enabled, a "yes" result is obtained. When file transfer has not been enabled, a "no" result is obtained.

When a "no" result is obtained in step 404, establish file transfer communication is performed (step 406) and process 400 returns to step 404. When a "yes" result is obtained in step 404, a determination is made as to whether a session is a multiple session (step 408). A multiple session indicates to the screen manager that more than one system user interface needs to be represented on the graphical user interface. When a multiple system session is determined, a "yes" result is obtained. When no multiple system session is determined, a "no" result is obtained. When a "no" result is obtained step 408 process 400 returns to step 404.

When a "yes" result is obtained in step 408, monitor the location of a selector is performed to establish the starting location of the selector (step 410). As the selector location is monitored continuously, a determination is made as to whether an object has been selected by the selector in the first region (step 412). The first region is the location of the selector prior to the selection being made. When an object has been selected, a "yes" result is obtained. When no object has been selected, a "no" result is obtained.

When a "no" result is obtained in step 412, process 400 returns to step 410 to continuously monitor the selector. When a "yes" is obtained in step 412, a determination is made as to whether the selection has crossed the boundary (step 414). The boundary demarcates the first region from the second region of the display. A boundary exists in some visible or invisible form between each system displayed on the graphical user interface of the display. When the selection has crossed the boundary, a "yes" result is obtained. When the selection has not crossed the boundary, a "no" result is obtained.

When a "no" result is obtained in step 414, process 400 returns to step 410 to continuously monitor the selector. When a "yes" is obtained in step 414, initiate file transfer of data from a system containing source data to a system to contain target data is performed step 416). A determination is made as to whether to request a user input for target data placement of transferred data (step 418). If a determination is made to request the user input, a "yes" result is obtained. If a determination is made to not request the user input, a "no" result is obtained.

When a "no" result is obtained in step 418, use file transfer default values occurs (step 428). File transfer default values typically exist to place received data into a predetermined location such as a temporary directory or download directory storage location. File transfer defaults 428 may typically be stored for use in a location such as application preferences or user preferences on storage devices 116 of system 100 of FIG. 1. Process 400 then skips to step 424.

When a "yes" result is obtained in step 418, a request for user input for target data placement information is performed in which a user initiating the file transfer is requested to provide target data placement information (step 420). The target data placement information is the location information of the data that is to be placed on the target or second system. Process 400 then receives the location information from the user input (step 422). The object from the first data processing system associated with the first region is transferred to the second data processing system associated with the second region. Complete the file transfer is performed (step 424), with process 400 terminating thereafter (step 426). Complete the file transfer in step 426 is a step that determines if the transfer was successful. Typically when the transfer is not completed successfully notification is sent to the user as well as a request to retry the operation.

Figure 5:
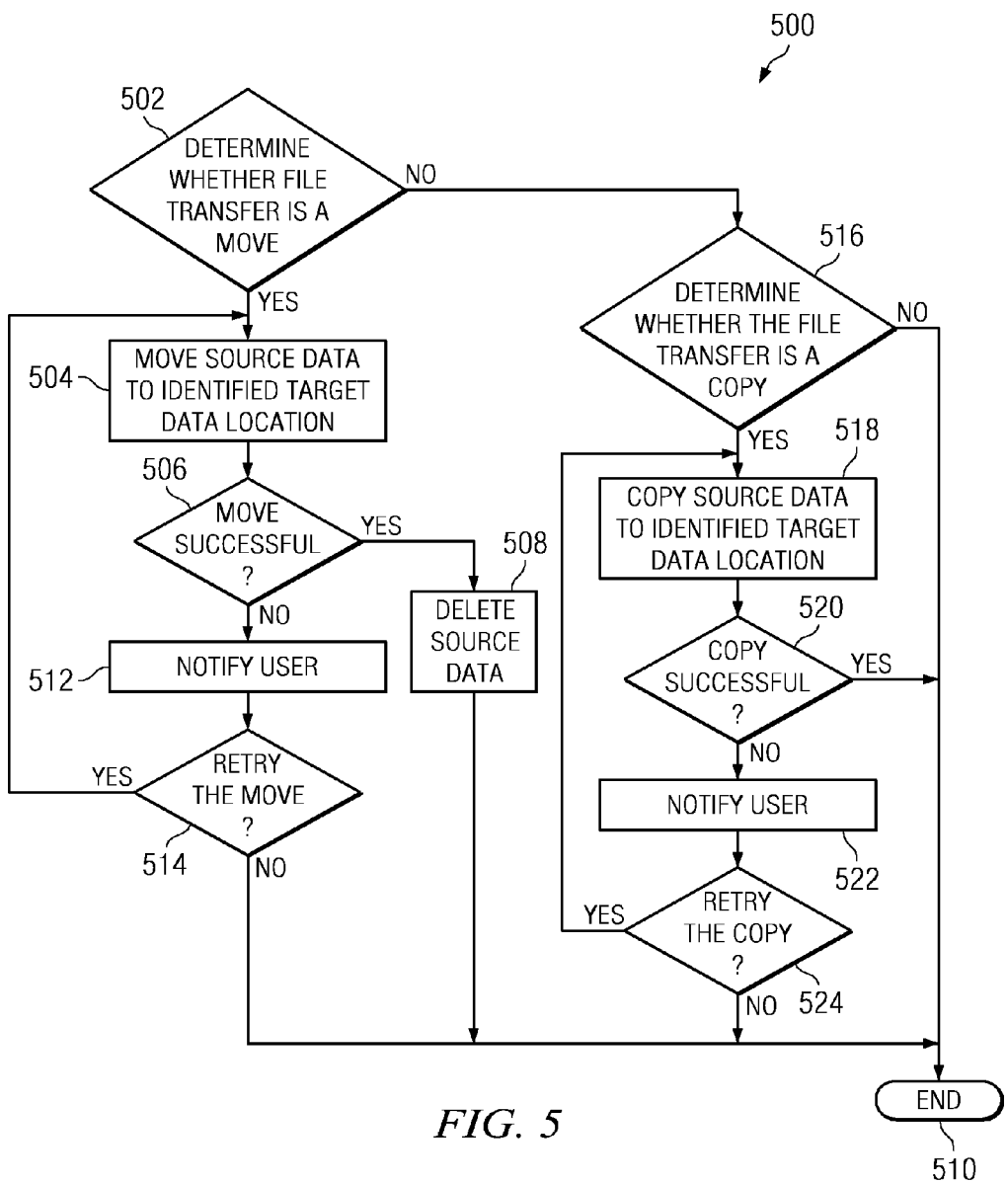
FIG. 5 is a flowchart of a completion operation within the file transfer process of FIG. 4, in accordance with illustrative embodiments.

With reference to FIG. 5, a flowchart of a completion operation within the file transfer process of FIG. 4 is presented, in accordance with illustrative embodiments. Process 500 is an example of the completion of complete file transfer step 424 of FIG. 4.

Process 500 initially determines whether file transfer is a move operation (step 502). When a determination is made that the file transfer is a move, a "yes" result is obtained. When a determination is made that the file transfer is not a move, a "no" result is obtained. When a "no" result is obtained, completion operation 500 skips to step 516. When a "yes" result is obtained, move source data to identified target data location is performed (step 504). A determination is made as to whether the move was successful (step 506). When the move is successful, a "yes" result is obtained. When the move is not successful, a "no" result is obtained.

When a "no" result is obtained in step 506, notify user is performed to send a notice to the requesting user that the move operation has failed (step 512). Notification is performed through the typical system interfaces. A determination is then made as to whether to retry the move (step 514). When a retry is determined, a "yes" result is obtained. When no retry is determined a "no" result is obtained. When a "no" result is obtained in step 514, completion operation 500 terminates (step 510). When a "yes" is obtained in step 514, completion operation 500 returns to step 504.

When a "yes" result is obtained in step 506, a delete source data operation removes the source data from the source system and the corresponding representation in the first region of the graphical user interface (step 508) with process 500 terminating thereafter (step 510). The source data is thus removed from the source system in accordance with the move request operation instance of the file transfer request.

When a "no" is obtained in step 502, process 500 determines whether the file transfer is a copy operation (step 516). When a determination is made that the file transfer is a copy, a "yes" result is obtained. When a determination is made that the file transfer is not a copy, a "no" result is obtained. When a "no" result is obtained, completion operation 500 terminates thereafter (step 510). When a "yes" result is obtained, copy source data to identified target data location is performed (step 518). A determination is made as to whether the copy was successful (step 520). When the copy is successful, a "yes" result is obtained. When the copy is not successful a "no" result is obtained.

When a "no" result is obtained in step 520, notify user is performed to send a notice to the requesting user that the copy operation failed (step 522). Notification of the copy failure is performed through the typical system interfaces. A determination is then made as to whether to retry the copy (step 524). When a retry is determined, a "yes" result is obtained. When "no retry" is determined a "no" result is obtained. When a "no" result is obtained in step 524, process 500 terminates (step 510). When a "yes" is obtained in step 524, process 500 returns to step 518.

When a "yes" result is obtained in step 520, completion operation 500 terminates thereafter (step 510). The source data has been copied from the source data system in accordance with the copy request operation instance of the file transfer request.

Illustrative embodiments thus provide information transfer in which a plurality of systems coupled to a graphical user interface enabled display device provides a capability to selectively transfer data represented by an object from a source data system to a target data system. The file transfer process is initiated by a determination that a selector, having picked on object, has crossed a boundary separating a first region associated with a source system from a second region associated with a target system. The file transfer target data location is determined by a set of file transfer defaults or a response to a request for user input for a target data location.

The flowchart and block diagrams in the figures illustrate the architecture, functionality, and operation of possible implementations of systems, methods and computer program products, according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, the practical application, and to enable others of ordinary skill in the art to understand the invention for various embodiments, with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by, or in connection with, a computer or any instruction execution system. For the purposes of this description, a computer-usable or computer-readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments, with various modifications as are suited to the particular use contemplated.

What is claimed is:

1. A computer-implemented method for information transfer, the computer-implemented method comprising:
    displaying a graphical user interface on a display device comprising a user interface of each respective data processing system, providing a logically partitioned display area in a multiple system session, wherein the graphical user interface has a plurality of regions, each region defined by boundaries presented concurrently on a screen of the display device, wherein each region represents output from an associated different data processing system;
    tracking successive locations of a selector associated with a user input device for each data processing system associated with a respective region on the screen, wherein the tracking includes a visual cue representative of a dragging operation;
    detecting a crossing of the selector and an object dragged by the selector across a boundary indicating a plane has been crossed between a first region and a second region in the plurality of regions on the screen wherein the object represents information stored in a first data processing system associated with the first region; and
    responsive to detecting the crossing of the selector and the object, initiating a transfer of the information associated with the object from the first data processing system associated with the first region to an identified location in a second data processing system associated with the second region before dropping the object, wherein the initiating the transfer comprises one of obtaining file transfer default values from the first data processing system and obtaining location information from a user.

2. The computer-implemented method of claim 1 wherein displaying a graphical user interface further comprises:
    determining whether a file transfer is enabled; and
    responsive to a determination that the file transfer is not enabled, establishing file transfer communication through a file transfer device.

3. The computer-implemented method of claim 1 wherein transferring the information further comprises:
    selecting of the object by a selector, wherein the selector moves the object across the boundary between the first region and the second region;
    determining whether to request a user input for placement of the object in the second data processing system;
    responsive to a determination to request for the user input, requesting the user input for location information for the placement of the object in the second data processing system; and
    obtaining the location information.

4. The computer-implemented method of claim 3 wherein transferring the information further comprises:
    responsive to a determination to not request for the user input, using the file transfer default values.

5. The computer-implemented method of claim 1 wherein transferring the information further comprises:
    determining whether transferring the information is a move operation, wherein the object is to be deleted from the first data processing system;
    responsive to transferring the information being a move operation, moving the object from the first data processing system associated with the first region to the second data processing system associated with the second region; and
    deleting the object from the first data processing system and the first region of the graphical user interface.

6. The computer-implemented method of claim 1 wherein transferring the information further comprises:
    determining whether transferring the information is a copy operation; and
    responsive to transferring the information being a copy operation, copying the object from the first data processing system associated with the first region to the second data processing system associated with the second region.

7. The computer-implemented method of claim 1 wherein transferring the information further comprises:
    determining whether transferring the information is successful; and
    responsive to a determination that transferring the information is not successful, notifying the user and requesting the user to retry.

8. An apparatus for information transfer, the apparatus comprising:
    a communications fabric;
    one or more computer readable storage devices and one or more computer readable memories connected to the communications fabric, which contains computer-executable code stored therein;
    a communications unit connected to the communications fabric;
    a display device connected to the communications fabric; and a processor unit connected to the communications fabric, wherein the processor unit includes one or more processors;

program instructions stored in at least one of one or more computer-readable storage devices for execution by at least one of the one or more processors via at least one of the one or more memories for displaying a graphical user interface on a display device comprising a user interface of each respective data processing system, providing a logically partitioned display area in a multiple system session, wherein the graphical user interface has a plurality of regions, each region defined by boundaries presented concurrently on a screen of the display device, wherein each region represents output from an associated different data processing system;

program instructions stored in at least one of one or more computer-readable storage devices for execution by at least one of the one or more processors via at least one of the one or more memories for tracking successive locations of a selector associated with a user input device for each data processing system associated with a respective region on the screen, wherein the tracking includes a visual cue representative of a dragging operation;

program instructions stored in at least one of one or more computer-readable storage devices for execution by at least one of the one or more processors via at least one of the one or more memories for detecting a crossing of the selector and an object dragged by the selector across a boundary indicating a plane has been crossed between a first region and a second region in the plurality of regions on the screen wherein the object represents information stored in a first data processing system associated with the first region; and program instructions stored in at least one of one or more computer-readable storage devices for execution by at least one of the one or more processors via at least one of the one or more memories for initiating transfer of, responsive to detecting the crossing of the selector and the object, the information associated with the object from the first data processing system associated with the first region to an identified location in a second data processing system associated with the second region before dropping the object, wherein the initiating the transfer comprises one of obtaining file transfer default values from the first data processing system and obtaining location information from a user.

9. The apparatus of claim 8 further comprising:

program instructions stored in at least one of one or more computer-readable storage devices for execution by at least one of the one or more processors via at least one of the one or more memories for determining whether a file transfer is enabled; and program instructions stored in at least one of one or more computer-readable storage devices for execution by at least one of the one or more processors via at least one of the one or more memories for establishing, responsive to a determination that the file transfer is not enabled, file transfer communication through a file transfer device.

10. The apparatus of claim 8, further comprising:

program instructions stored in at least one of one or more computer-readable storage devices for execution by at least one of the one or more processors via at least one of the one or more memories for select the object by a selector, wherein the selector moves the object across the boundary between the first region and the second region;

program instructions stored in at least one of one or more computer-readable storage devices for execution by at least one of the one or more processors via at least one of the one or more memories for determining whether to request a user input for location information for the placement of the object in the second data processing system;

program instructions stored in at least one of one or more computer-readable storage devices for execution by at least one of the one or more processors via at least one of the one or more memories for requesting, responsive to a determination to request the user input, the user input for location information for the placement of the object in the second data processing system; and program instructions stored in at least one of one or more computer-readable storage devices for execution by at least one of the one or more processors via at least one of the one or more memories for obtaining the location information.

11. The apparatus of claim 10, further comprising:

program instructions stored in at least one of one or more computer-readable storage devices for execution by at least one of the one or more processors via at least one of the one or more memories for using, responsive to a determination to not request the user input, the file transfer default values.

12. The apparatus of claim 8 further comprising:

program instructions stored in at least one of one or more computer-readable storage devices for execution by at least one of the one or more processors via at least one of the one or more memories for determining whether transferring the information is a move operation, wherein the object is to be deleted from the first data processing system;

program instructions stored in at least one of one or more computer-readable storage devices for execution by at least one of the one or more processors via at least one of the one or more memories for moving, responsive to a determination that transferring the information is a move operation, the object from the first data processing system associated with the first region to the second data processing system associated with the second region; and program instructions stored in at least one of one or more computer-readable storage devices for execution by at least one of the one or more processors via at least one of the one or more memories for deleting the object from the first data processing system and the first region of the graphical user interface.

13. The apparatus of claim 8, further comprising:

program instructions stored in at least one of one or more computer-readable storage devices for execution by at least one of the one or more processors via at least one of the one or more memories for determining whether transferring the information is a copy operation; and program instructions stored in at least one of one or more computer-readable storage devices for execution by at least one of the one or more processors via at least one of the one or more memories for copying, responsive to a determination that transferring the information is a copy operation, the object from the first data processing system associated with the first region to the second data processing system associated with the second region.

14. The apparatus of claim 8 wherein the processor unit executes the computer-executable code to direct the apparatus to transfer the information further comprises:

program instructions stored in at least one of one or more computer-readable storage devices for execution by at least one of the one or more processors via at least one of the one or more memories for determining whether transferring the information is successful; and program instructions stored in at least one of one or more computer-readable storage devices for execution by at least one of the one or more processors via at least one of the one or more memories for notifying, responsive to a determination that transferring the information is not successful, the user and request the user to retry.

15. A computer program product for information transfer, the computer program product comprising:

one or more computer-readable non-transitory storage devices;

program instructions stored in at least one of one or more computer-readable non-transitory storage devices for displaying a graphical user interface on a display device comprising a user interface of each respective data processing system, providing a logically partitioned display area in a multiple system session, wherein the graphical user interface has a plurality of regions, each region defined by boundaries presented concurrently on a screen of the display device, wherein each region represents output from an associated different data processing system;

program instructions stored in at least one of one or more computer-readable non-transitory storage devices for tracking successive locations of a selector associated with a user input device for each data processing system associated with a respective region on the screen, wherein the tracking includes a visual cue representative of a dragging operation;

program instructions stored in at least one of one or more computer-readable non-transitory storage devices for detecting a crossing of the selector and an object dragged by the selector across a boundary indicating a plane has been crossed between a first region and a second region in the plurality of regions on the screen wherein the object represents information stored in a first data processing system associated with the first region;

program instructions stored in at least one of one or more computer-readable non-transitory storage devices for transferring, responsive to detecting the crossing of the selector and the object, the information associated with the object from the first data processing system associated with the first region to a second data processing system associated with the second region before dropping the object, wherein the initiating the transfer comprises one of obtaining file transfer default values from the first data processing system and obtaining location information from a user.

16. The computer program product of claim 15, further comprising:

program instructions stored in at least one of one or more computer-readable non-transitory storage devices for determining whether a file transfer is enabled; and program instructions stored in at least one of one or more computer-readable non-transitory storage devices for establishing, responsive to a determination that the file transfer is not enabled, file transfer communication through a file transfer device.

17. The computer program product of claim 15, further comprising:

program instructions stored in at least one of one or more computer-readable non-transitory storage devices for selecting of the object by a selector, wherein the selector moves the object across the boundary between the first region and the second region;

program instructions stored in at least one of one or more computer-readable non-transitory storage devices for determining whether to request a user input for location information for placement of the object in the second data processing system;

program instructions stored in at least one of one or more computer-readable non-transitory storage devices for requesting, responsive to a determination to request the user input, the user input for location information for the placement of the object in the second data processing system;

program instructions stored in at least one of one or more computer-readable non-transitory storage devices for obtaining the location information; and program instructions stored in at least one of one or more computer-readable non-transitory storage devices for using, responsive to a determination to not request the user input, the file transfer default values.

18. The computer program product of claim 15, further comprising:

program instructions stored in at least one of one or more computer-readable non-transitory storage devices for determining whether transferring the information is a move operation, wherein the object is to be deleted from the first data processing system;

program instructions stored in at least one of one or more computer-readable non-transitory storage devices for moving, responsive to a determination that transferring the information is a move operation, the object from the first data processing system associated with the first region to the second data processing system associated with the second region; and program instructions stored in at least one of one or more computer-readable non-transitory storage devices for deleting the object from the first system.

19. The computer program product of claim 15, further comprising:

program instructions stored in at least one of one or more computer-readable non-transitory storage devices for determining whether transferring the information is a copy operation; and program instructions stored in at least one of one or more computer-readable non-transitory storage devices for copying, responsive to transferring the information being a copy operation, the object from the first data processing system associated with the first region to the second data processing system associated with the second region.

20. The computer program product of claim 15 wherein computer-executable code for transferring the information further comprises:

program instructions stored in at least one of one or more computer-readable non-transitory storage devices for determining whether transferring the information is successful; and program instructions stored in at least one of one or more computer-readable non-transitory storage devices for notifying, responsive to a determination that transferring the information is not successful, for notifying the user and requesting the user to retry.

* * * * *